(12) United States Patent
Pighi et al.

(10) Patent No.: US 11,332,014 B2
(45) Date of Patent: *May 17, 2022

(54) AUXILIARY POWER SUPPLY SYSTEM FOR HIGH POWER LOADS IN A HYBRID/ELECTRIC VEHICLE

(71) Applicant: Ambarella International LP, Santa Clara, CA (US)

(72) Inventors: Omar Pighi, Parma (IT); Paolo Grisleri, Roveleto di Cadeo (IT); Alessandro Giacomazzo, Parma (IT)

(73) Assignee: Ambarella International LP, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/169,443

(22) Filed: Feb. 6, 2021

(65) Prior Publication Data
US 2021/0155094 A1 May 27, 2021

Related U.S. Application Data

(63) Continuation of application No. 16/371,319, filed on Apr. 1, 2019, now Pat. No. 10,960,764.

(30) Foreign Application Priority Data

Jun. 28, 2018 (IT) .................. 102018000006790

(51) Int. Cl.
| | |
|---|---|
| *B60L 1/00* | (2006.01) |
| *B60L 53/20* | (2019.01) |
| *B60L 50/60* | (2019.01) |
| *B60K 6/48* | (2007.10) |
| *B60K 35/00* | (2006.01) |

(Continued)

(52) U.S. Cl.
CPC .................. *B60L 1/00* (2013.01); *B60K 6/48* (2013.01); *B60K 35/00* (2013.01); *B60L 50/60* (2019.02); *B60L 53/20* (2019.02); *H02J 7/0013* (2013.01); *B60L 2210/10* (2013.01); *H02J 7/0045* (2013.01); *H02J 9/061* (2013.01); *Y10S 903/903* (2013.01)

(58) Field of Classification Search
CPC ........ B60L 1/00; B60L 53/20; B60L 2210/10; Y02T 90/14
See application file for complete search history.

(56) References Cited

U.S. PATENT DOCUMENTS 10,960,764 B2 * 3/2021 Pighi ...................... B60K 35/00

\* cited by examiner

*Primary Examiner* — Jeffrey M Shin
(74) *Attorney, Agent, or Firm* — Christopher P. Maiorana, PC (57) ABSTRACT

An apparatus includes a first interface a second interface, a third interface and a converter. The first interface may be configured to exchange a high-voltage signal with a high-voltage battery of a vehicle. The second interface may be configured to receive a first low-voltage signal from a source external to the vehicle. The third interface may be configured to present a second low-voltage signal to a power rail of the vehicle. The converter may be configured to (i) generate the high-voltage signal by up-converting the first low-voltage signal while in an up-conversion mode to recharge the high-voltage battery of the vehicle and (ii) generate the second low-voltage signal on the power rail by down-converting the high-voltage signal received from the high-voltage battery while in a down-conversion mode.

16 Claims, 3 Drawing Sheets

(51) Int. Cl.
*H02J 7/00* (2006.01)
*H02J 9/06* (2006.01)

AUXILIARY POWER SUPPLY SYSTEM FOR HIGH POWER LOADS IN A HYBRID/ELECTRIC VEHICLE

This application relates to Italian Application No. 102018000006790, filed Jun. 28, 2018. This application also relates to U.S. application Ser. No. 16/371,319, filed on Apr. 1, 2019. Each of the mentioned applications are hereby incorporated by reference in its entirety.

FIELD OF THE INVENTION

The invention relates to vehicle power systems generally and, more particularly, to a method and/or apparatus for implementing an auxiliary power supply system for high power loads in a hybrid/electric vehicle.

BACKGROUND

Improvements in electronics for modern hybrid/electric automobiles result in high current demands. While the automobile is running, a limited amount of current is available. The amount of current is determined by the manufacturer to meet a maximum current that the automobile systems can consume. A small "extra" current capacity is commonly left in reserve. After-market high-power loads added to the automobile typically exceed the reserve current capacity of the power source. Furthermore, when the automobile is not running, conventional batteries typically cannot meet the steady-state current demands of the high-power loads. If the batteries can satisfy the loads, the batteries are usually drained in a short time. A conventional solution is to provide additional batteries to lengthen the battery-only time. However, the additional batteries consume a large amount of space and add significant weight to the automobile.

It would be desirable to implement an auxiliary power supply system for high power loads in a hybrid/electric vehicle.

SUMMARY

The invention concerns an apparatus including a first interface a second interface, a third interface and a converter. The first interface may be configured to exchange a high-voltage signal with a high-voltage battery of a vehicle. The second interface may be configured to receive a first low-voltage signal from a source external to the vehicle. The third interface may be configured to present a second low-voltage signal to a power rail of the vehicle. The converter may be configured to (i) generate the high-voltage signal by up-converting the first low-voltage signal while in an up-conversion mode to recharge the high-voltage battery of the vehicle and (ii) generate the second low-voltage signal on the power rail by down-converting the high-voltage signal received from the high-voltage battery while in a down-conversion mode.

BRIEF DESCRIPTION OF THE FIGURES

Embodiments of the invention will be apparent from the following detailed description and the appended claims and drawings in which:

DETAILED DESCRIPTION OF THE EMBODIMENTS

Embodiments of the present invention include providing an auxiliary power supply system for high power loads in a hybrid/electric vehicle that may (i) provide an after-market technique to accommodate high-power electrical loads, (ii) provide current beyond a main power distribution system capacity, (iii) power electrical loads for a long time while an engine is switched off, (iv) operate from electrical power received from a wall source (v) operate from electronic power received from an auxiliary source and/or (vi) provide uninterrupted electrical power while hot-swapping between power sources.

Embodiments of the invention generally provided an auxiliary power system and auxiliary power distribution technique that are capable of powering a secondary power bus independent from a main electrical bus of a hybrid or electric type vehicle (e.g., automobile, truck, bus, etc.). A vehicle power source of the hybrid type vehicle may generate electrical power derived from an internal combustion engine. A main high-voltage battery of an all-electric type vehicle may provide the electrical power. Use of electrical power from the internal combustion engine and vehicle power source and/or the main high-voltage battery may be considered a "vehicle powered mode."

In hybrid type vehicles, a generator (or alternator) in the vehicle power source may provide high-voltage power to charge the main high-voltage battery. In all-electric type vehicles, an AC/DC converter may convert external AC power to generate the high-voltage power to charge the main high-voltage battery. The vehicle power source and/or the main high-voltage battery may provide electrical power to a vehicle DC/DC down-converter that generates low-voltage electrical power on a main power bus. The high-voltage electrical power may also be shared by the auxiliary power system and, if present, an electric drive system. The secondary power bus and the main power bus may be electrically independent and physically separate from each other. The secondary power bus may be operational while the engine (e.g., an internal combustion engine or electric drive engine) of the vehicle is switched off.

Various embodiments of the invention may utilize the auxiliary power system to provide electrical power to high power loads connected to the secondary power bus. In some cases, the high power loads may be loads that draw on average more electrical current than the vehicle power source may produce and/or the main power bus may distribute. In various situations, the high power loads may be loads that draw surge currents greater than a capacity of the vehicle power source and/or the main power bus without impacting the rest of the vehicle electronics. In some embodiments, the auxiliary power system may provide up to 15 kilowatts (kW) of power to the secondary power bus for extended periods. For example, the auxiliary power system may provide 1.5 kW of power to loads on the secondary power bus from a 10 kW hour (kWh) capacity battery for up to 6.4 hours, 5 kW of power from a 30 kWh capacity for 6 hours, and 15 kW of power from a 100 kWh capacity for up to 6.4 hours after the hybrid vehicle engine is switched off and the main high-voltage battery is fully charged.

In various embodiments, the auxiliary power system may receive electrical power from an AC powered battery charger connection and/or another source (e.g., an auxiliary power unit) inside and/or outside the vehicle. Distribution of electrical power from the battery charger may be referred to as a "wall powered mode." Distribution of electrical power from the auxiliary power unit may be referred to as an "auxiliary power mode." The battery charger may drive the high power loads for an unlimited amount of time during indoor employment or outdoor employment (e.g., software testing, etc.) with the hybrid vehicle engine off or the electric vehicle main high-voltage battery nearly discharged. The unlimited engine-off/low main high-voltage battery charge operation of the high power loads may allow sufficient time to perform diagnostics, uploading and/or downloading of information to and from the electronics. For example, data gathered and stored during autonomous-driving trips may be downloaded from autonomous driving computers powered through the secondary power bus while the vehicle is inside a garage. Electrical power from the battery charger and/or auxiliary power unit may also be used to charge one or more batteries internal to the auxiliary power system.

The auxiliary power system may provide limited electrical power to the secondary power bus in the absence of power from the main high-voltage battery, the battery charger and the auxiliary power unit. The auxiliary power system may also enable hot swapping among the various sources of electrical power. A backup battery internal to the auxiliary power system generally allows smooth switching among the vehicle power mode, the wall power mode and the auxiliary power mode without interrupting or compromising operations of the loads that rely on power from the secondary power bus.

Figure 1:
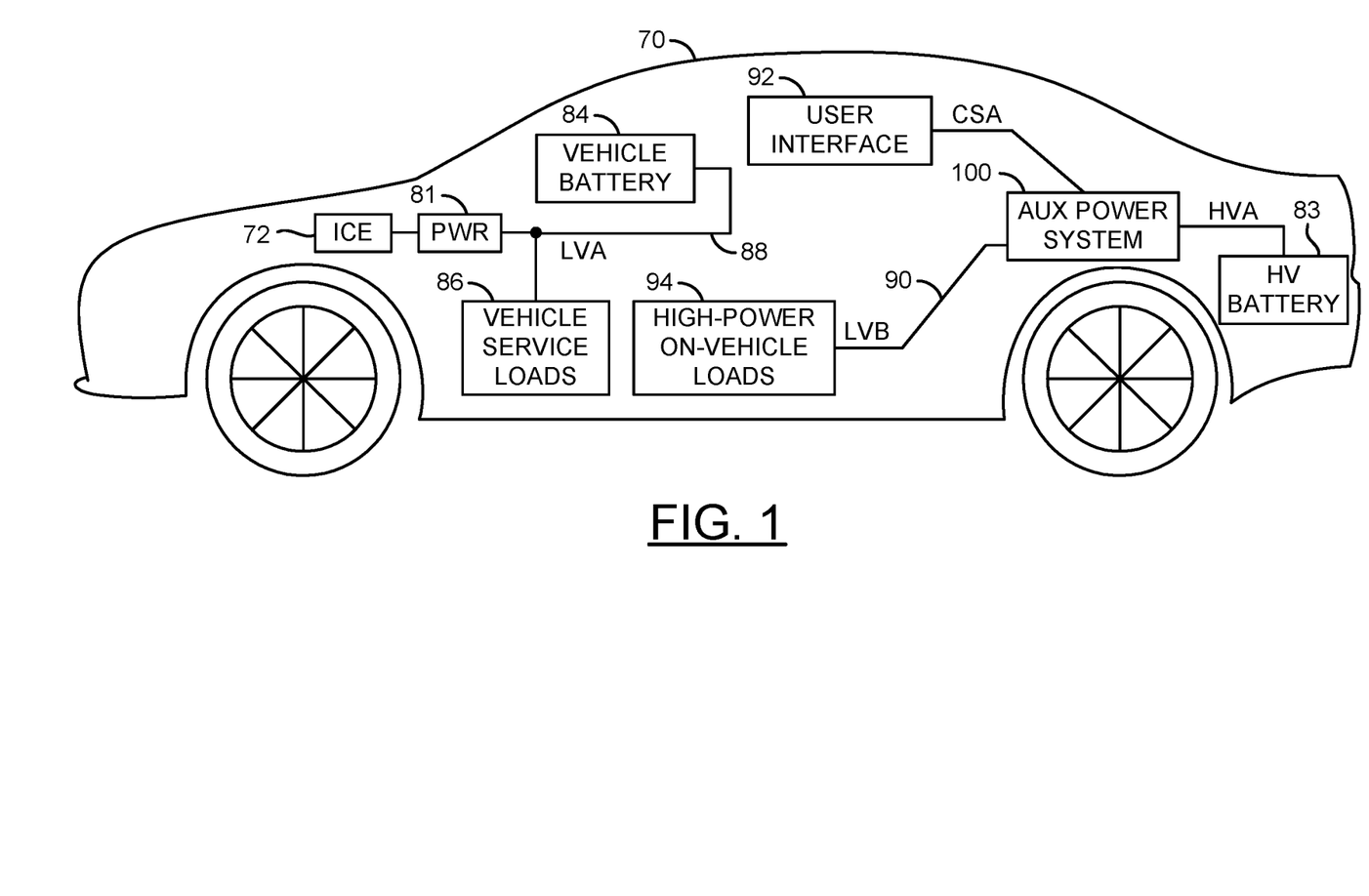
FIG. 1 is a diagram of a vehicle in accordance with an embodiment of the invention.

Referring to FIG. 1, a diagram of an example implementation of a vehicle 70 is shown in accordance with an embodiment of the invention. The vehicle 70 may be an automobile, a truck, a bus, or any other passenger and/or cargo carrying vehicle powered by an engine. The vehicle 70 may include an engine compartment (or area), a passenger compartment (or area) and a trunk compartment (or area). The vehicle 70 generally comprises the engine 72, a device (or circuit) 81, a device (or circuit) 83, a device (or circuit) 84, a device (or circuit) 86, a device (or circuit) 88, a device (or circuit) 90, a device (or circuit) 92, a device (or circuit) 94 and a device (or circuit) 100.

A signal (e.g., CSA) may be transferred between the device 92 and the device 100. The command/status signal CSA may carry command data and status data between the devices 92 and 100. A signal (e.g., LVA) may be generated by the device 81 and transferred by the device 88 to the devices 84, 86 and 100. The signal LVA may implement a low-voltage power signal. In various embodiments, the low voltage in the signal LVA may range from approximately 10 volts DC to approximately 50 volts DC. A signal (e.g., LVB) may be generated by the device 100 and transferred to the device 94 via the device 90. The signal LVB may implement another low-voltage power signal. The voltage in the signal LVB may be similar to the voltage in the signal LVA. A signal (e.g., HVA) may be exchanged between the device 83 and the device 100. The signal HVA may represent a high-voltage power signal. In various embodiments, the voltage of the signal HVA may range from approximately 200 volts direct current (VDC) to approximately 600 VDC.

The engine 72 may implement an internal combustion engine in a hybrid type of vehicle 70. The engine 72 may implement an electric drive engine in an all-electric type of vehicle 70. The engine 72 is generally operational to provide mechanical power to a transmission of the vehicle 70 and, wherein implemented, a generator in the device 81. In various embodiments, the high-voltage generated by the generator may range from approximately 200 VDC to approximately 600 VDC.

The device 81 may implement a vehicle power source of the hybrid-type vehicles and/or the electric-type vehicles. The vehicle power source 81 may be operational to provide low-voltage electrical power in the signal LVA for the devices 84 and 86. The vehicle power source 81 may also be operational to provide high-voltage power for the devices 83 and 100.

The device 83 may implement a main high-voltage battery of the hybrid-type vehicles and/or the electric-type vehicles. The main high-voltage battery 83 may be operational to provide high-voltage electrical power to the device 100 and one or more drive motors of the vehicle 72. In various embodiments, the storage voltage of the main high-voltage battery 83 may range from approximately 200 VDC to approximately 600 VDC. Bigger vehicles may accommodate higher capacity batteries and/or more than one battery 83. The main high-voltage battery 83 may be charged and/or discharged by the device 100 through the signal HVA and through the vehicle power source 81.

The device 84 may implement a battery. In various embodiments, the battery 84 may be a normal automotive (or vehicle) battery. The vehicle battery 84 may be charged by the vehicle power source 81 via the signal LVA. The vehicle battery 84 may provide electrical power in the signal LVA to other electronics in the vehicle 70 while being discharged. The low-voltage generated by the vehicle battery 84 may range from approximately 8 volts DC to approximately 50 volts DC. The vehicle battery 84 is generally located in the engine compartment.

The device 86 may implement vehicle service load devices (or circuits). The service load devices (or service loads for short) 86 may receive electrical power from the vehicle battery 84 and/or the vehicle power source 81 in the signal LVA. The vehicle service loads 86 may include, but are not limited to, exterior lighting, interior lighting, electronic control units, door locks, window motors, wiper blades, fans, radio, air conditioning, seat heaters, seat adjustments and the like. The vehicle service loads may be located throughout the vehicle 70, in the engine compartment, the passenger compartment, the trunk and/or other locations.

The device 88 may implement a main low-voltage bus (or power rail, or harnessing, or wiring). The main low-voltage bus 88 may be operational to distribute the signal LVA among the vehicle power source 81, the vehicle battery 84 and the vehicle service loads 86. In various embodiments, the main low-voltage bus 88 may utilize the vehicle chassis as a ground bus.

The device 90 may implement an auxiliary low-voltage bus (or power rail, or harnessing, or wiring). The auxiliary low-voltage (or secondary) bus 90 may be operational to distribute the signal LVB from the device 100 to the device 94. The auxiliary low-voltage bus 90 may be electrically isolated from the main low-voltage bus 88. The isolation may include separate hot wires and separate ground wires from the main low-voltage bus 88. In various embodiments, the low voltage generated by the device 100 in the signal LVB may range from approximately 10 volts DC to approximately 50 volts DC.

The device 92 may implement a user interface device (or circuit). The user interface device 92 may be operational for bidirectional communication with the device 100 via the signal CSA. The communications may be based on an Ethernet protocol, a Controller Area Network protocol, a Universal Serial Bus protocol or similar standard techniques. Information conveyed by the signal CSA may include, but is not limited to systems status, current energy source status, flowing current, voltages and estimated remaining time using the main high-voltage battery 83 at the current rate (while the internal combustion engine 72 is off in a hybrid-type vehicle 70). The user interface device 92 may allow a user to switch between different energy sources and/or different system status indicators. The user interface device 92 is generally located in the passenger compartment.

The device 94 may implement one or more high-power on-vehicle load devices (or circuits). The high-power load device (or high-power loads for short) 94 may receive electrical power from the device 100 in the signal LVB. The high-power loads 94 may include, but are not limited to, cooling system, autonomous driving computers, advanced driving assistance systems, multimedia systems, computers, actuators and cleaning systems for sensors. The high-power loads 94 may be located in multiple locations about the vehicle 70 including, but not limited to, a roof space, a trunk, external parts of the shell (or body), a passenger cabin and the like.

The device 100 may implement an auxiliary power system. The auxiliary power system (or circuit or unit) 100 may be operational to provide low-voltage electrical power in the signal LVB to the high-power loads 94. The auxiliary power system 100 may also be operational to provide high-voltage electrical power in the signal HVA to charge the main high-voltage battery 83. The auxiliary power system 100 may be operational to store electrical energy in one or more internal batteries to provide a limited storage capacity in a small physical area and/or to provide for uninterrupted power to the high-power loads during mode switches. The auxiliary power system 100 is generally located in the trunk and may be accessible to a user while the trunk door is open. Some parts, such as DC/DC converters, may utilize liquid cooling and so may be installed in the engine bay and linked to the engine or other cooling system.

Figure 2:
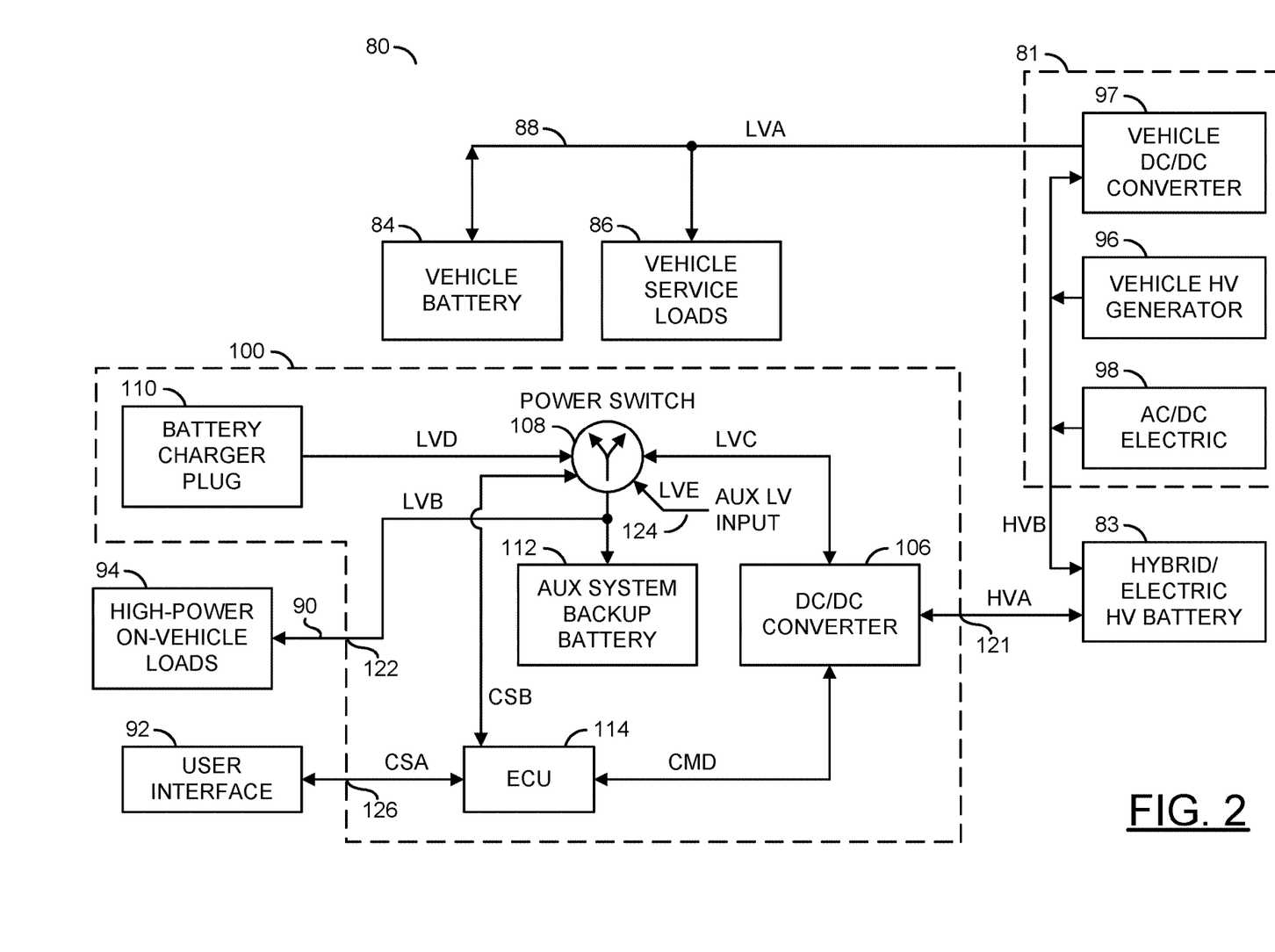
FIG. 2 is a diagram of an electrical system of the vehicle accordance with an embodiment of the invention.

Referring to FIG. 2, a diagram of an example implementation of an electrical system 80 of the vehicle 70 is shown in accordance with an embodiment of the invention. The electrical system 80 generally comprises the vehicle power source 81, the main high-voltage battery 83, the vehicle battery 84, the vehicle service loads 86, the main low-voltage bus 88, the auxiliary low-voltage bus 90, the user interface device 92, the high-power loads 94 and the auxiliary power system 100.

The vehicle power source 81 generally comprises a device (or circuit) 96, a device (or circuit) 97 and a device (or circuit) 98. The auxiliary power system 100 generally comprises a device (or circuit) 106, a device (or circuit) 110, a device (or circuit) 112 and a device (or circuit) 114. The main high-voltage battery may be connected to the auxiliary power system 100 at an interface (or port) 121. The auxiliary low-voltage bus 90 may connect to the auxiliary power system 100 at an interface (or port) 122. An interface (or port) 124 may connect the auxiliary power system 100 to another low-voltage power source. The auxiliary power system 100 may include an interface (or port) 126 connected to the user interface device 92.

The signal LVA may be exchanged at an interface between the main low-voltage bus 88 and the device 97. The signal LVB may be presented from the device 108 to the device 112 and the interface 122 of the auxiliary power system 100. A signal (e.g., LVC) may be exchanged between the device 106 and the device 108. The signal LVC may be a low-voltage signal. A voltage carried by the signal and LVC may be similar to the voltage in the signal LVB. A signal (e.g., LVD) may be transferred from the device 110 to the device 108. The signal LVD may be a low-voltage signal. A voltage carried by the signal and LVD may be similar to the voltage in the signal LVB. A signal (e.g., LVE) may be received by the device 108 from a source external to the auxiliary power system 100. The signal LVE may be a low-voltage signal. A voltage carried by the signal LVE may be similar to the voltage in the signal LVB.

The signal HVA may be exchanged between the interface 121 of the auxiliary power unit 100 and a secondary interface of the main high-voltage battery 83. A signal (e.g., HVB) may be generated by the devices 96 and/or 98 and transferred to the main high-voltage battery 83 and the device 97. The signal HVB may implement a high-voltage signal. The high-voltage signal HVB may range from approximately 200 VDC to approximately 600 VDC. The signal HVB may be received at a primary interface of the main high-voltage battery 83. In various embodiments, the primary interface and the secondary interface of the main high-voltage battery 83 may be the same interface. In other embodiments, the primary interface and the secondary interface of the main high-voltage battery 83 may be separate interfaces.

The signal CSA may be exchanged between the user interface device 92 and the device 114 through the interface 126. A signal (e.g., CSB) may be exchanged between the device 108 and the device 114. The command/status signal CSB may convey commands and data between the devices 108 and 114. A signal (e.g., CMD) may be exchanged between the device 106 and the device 114. The command/data signal CMD may carry commands and data between the devices 106 and 114.

The device 96 may implement a vehicle high-voltage generator. The vehicle high-voltage generator 96 is generally operational to generate high-voltage electrical power in the signal HVB based on the mechanical power received from the internal combustion engine 72. The vehicle high-voltage generator 96 may be absent from the electric-type vehicles.

The device 97 may implement a vehicle DC/DC converter. The vehicle converter 97 may be operational to down-convert the high-voltage signal HVB to generate the low-voltage signal LVA. The vehicle converter 97 may be implemented in both the hybrid-type vehicles and the electric-type vehicles.

The device 98 may implement an AC/DC electrical device. The AC/DC electrical device 98 is generally operational to generate the signal HVB from an external power source (e.g., AC wall power). The AC/DC electrical device 98 may be implemented in the electric-type vehicles to recharge the main high-voltage battery 83. The AC/DC electrical device 98 may be optional in the hybrid-type vehicles.

The device 106 may implement a DC/DC converter. In various embodiments, the converter 106 may implement a down-converter circuit. As a down-converter, the converter 106 may generate the low-voltage signal LVC by down-converting the high-voltage signal HVA received through the port 121. In some embodiments, converter 106 may implement a bidirectional converter. Control between down-converting and up-converting may be based on commands received in the signal CMD. As a down-converter, the bidirectional converter 106 may generate the low-voltage signal LVC by down-converting the high-voltage signal HVA. As an up-converter, the bidirectional converter 106 may generate the high-voltage signal HVA by up-converting the low-voltage signal LVC. In various embodiments, the converter 106 may down-convert up to 15,000 watts of power. The converter 106 may also up convert up to 15,000 watts of power.

The device 108 may implement a power switch (or switch for short). The switch 108 may be operational to control connecting and disconnecting the various low-voltage signals LVB, LVC, LVD and/or LVE using manual control and/or electrical control. Where manual control is implemented, the switch 108 may include a manual knob (or lever) accessible from an exterior of a housing of the auxiliary power system 100. The auxiliary power system 100 may be positioned in the trunk of the vehicle 70 such that the manual knob of the switch 108 is readily accessible to a user. Where electrical control is implemented, the switch 108 may communicate with the device 114 via the signal CSB.

In various embodiments, the switch 108 may be a double-pole N-throw switch. The value of N may range from 2 to 4, depending on the number of power sources available to the auxiliary power system 100. The switch 108 may be operational to route low-voltage power among the signals LVB, LVC, LVD and the LVE. In various embodiments, the switch 108 may be implemented as a break-before-make type of switch. In other embodiments, the switch 108 may be implemented as a make-before-break type of switch. In an example configuration, the switch 108 may connect and disconnect the signals LVC and LVB (e.g., 2P1T). In another example configuration, the switch 108 may switch the signal LVB between the signals LVC and LVD (e.g., 2P2T). In still another configuration, the switch 108 may switch the signal LVB between the signals LVC, LVD and LVE (e.g., 2P3T). The switch 108 may also be configured to connect the signal LVD or the signal LVE to the signal LVC to charge the main high-voltage battery 83 through the device 110. The switch 108 may also be configured to connect the signal LVD to the signals LVB and LVC simultaneously to charge both the main high-voltage battery 83 and the device 112 through the device 110. The device 110 may implement a battery charger plug (or wall plug). The battery charger plug 110 may be operational to generate the signal LVD from a power source external to the vehicle 70. In various embodiments, the power source may be a 120-volt alternating current (VAC) to direct current (VDC) power converter. Other power sources may be implemented to meet the design criteria of a particular application.

The device 112 may implement another low-voltage battery. The low-voltage battery 112 may be referred to as an auxiliary system backup battery. The auxiliary system backup battery 112 may be operational to store up to 100 ampere hours with a high in-rush current. The auxiliary system backup battery 112 generally allows a smooth switching between the vehicle mode and the wall power mode with the system on, without interrupting or compromising an ability to deliver power to the high-power loads 94. In various embodiments, the auxiliary system backup battery 112 may be located inside a housing of the auxiliary power system 100.

The device 114 may implement an electronic control unit (ECU). The electronic control unit 114 is generally operational to control the switch 108 and the converter 106 in response to commands received from the user interface device 92. In some designs, the electronic control unit 114 may be aware of a running/not running status of the engine 72.

During operations, the vehicle converter 97 generally steps down the high-voltage power in the signal HVB to create the signal LVA. Down-converting to the lower voltage may reduce a current value flowing in the signal HVB relative to the signal LVA. The main high-voltage battery 83 may provide high-voltage electrical power to the auxiliary power system 100 in the signal HVA. The converter 106 within the auxiliary power system 100 may generate the low-voltage power in the signal LVC. The low-voltage power in the signal LVC may be used internal to the auxiliary power system 100 and distributed to the high-power loads 94 in the signal LVB. Each signal LVC, LCD and/or LVE may also be routed to the auxiliary system backup battery 112 through the switch 108 as the signal LVB.

Since the high-power loads 94 generally draw power through the auxiliary power system 100, the total amount of power drawn may exceed the capacity of the vehicle power source 81 for a limited amount of time. With the main high-voltage battery 83 operating at or near full capacity, the auxiliary power system 100 may maintain generation of the low-voltage signal LVB by drawing additional electrical power from the main high-voltage battery 83. In some situations, the high-power loads 94 may draw more total power than the capacity of the converter 106. Therefore, the excessive power demands by the high-power loads 94 may be supplemented from the auxiliary system backup battery 112.

The signal LVD provided by the battery charger plug 110 may be routed to the high-power loads 94 and the auxiliary system backup battery 112 through the switch 108. The signal LVD may be derived from an external DC power supply used for indoor testing, software updating, data downloads and/or battery charging. The signal LVE may also be provided to the switch 108 through the auxiliary connector 124. The auxiliary connector 124 may receive low-voltage power from an auxiliary power source, such as a solar panel on a roof of the vehicle 70, or any other low-voltage power source available.

The converter 106 may be commanded to work in reverse mode and up-convert the low-voltage power in the signals LVD or LVE into the high-voltage power in the signal HVA. Operating the converter 106 as an up-converter may allow a recharge of the main high-voltage battery 83 using power taken from the battery charger plug 110 or from the auxiliary connector 124. A user may send commands and/or check DC/DC converter status using control and status signals in the signal CMD. The user can also manually and/or remotely control the switch 108 and check status of the switch 108 via the signal CSB.

Installation of the auxiliary power system 100 in the vehicle 70 may resolve issues with limited power available from the power source 81. The power source 81 is generally designed for a maximum power demand and a small percentage of extra available power sized for safety. The high-voltage power pulled from main high-voltage battery 83 may be current limited to avoid damaging main high-voltage battery 83. In various embodiments, the electronic control unit 114 may know the instantaneous amount of current used by the high-power loads 94. The electronic control unit 114 may dynamically control the converter 106 to adjust the amount of output current drawn from the main high-voltage battery 83.

The auxiliary power system 100 generally takes the stored high-voltage power from the main high-voltage battery 83 as the high-power loads 94 demand. The high-voltage power may be converted to the low-voltage using the converter 106. The low-voltage power in the signal LVB on the auxiliary low-voltage bus 90 may be physically and electrically separate from the signal LVA on the main low-voltage bus 88. Keeping the two power systems separate from each other generally avoids malfunctions of the original equipment manufacturer systems caused by issues on the auxiliary loads. For example, a failure of one or more high-power loads 94 may corrupt the auxiliary low-voltage bus 90 but the vehicle 70 may still be started and moved using the main low-voltage bus 88.

Figure 3:
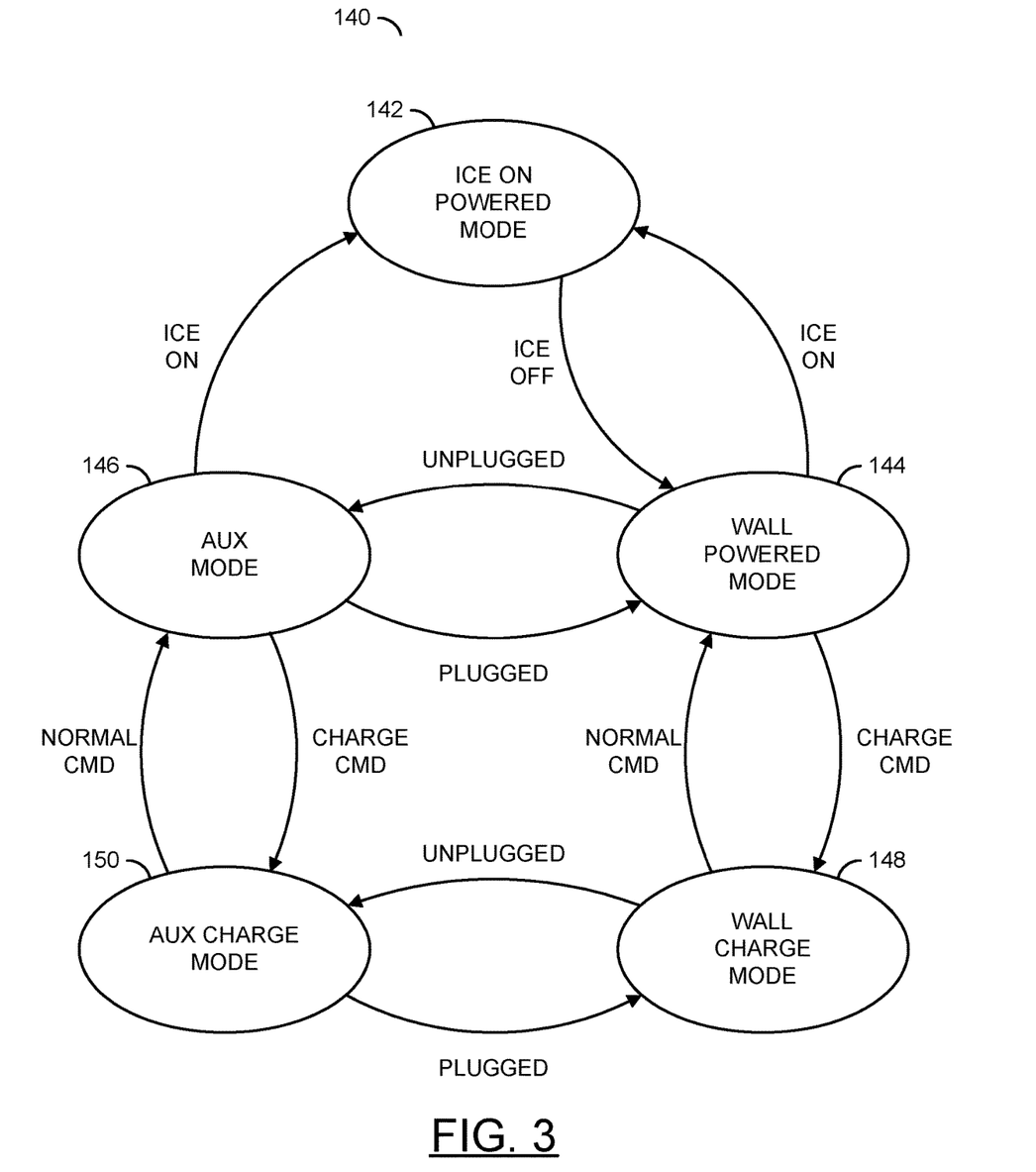
FIG. 3 is a state transition diagram of an electronic control unit of the electrical system in accordance with an embodiment of the invention.

Referring to FIG. 3, a state transition diagram 140 of an example implementation of the electronic control unit 114 is shown in accordance with an embodiment of the invention. The state transition diagram 140 generally provides multiple (e.g., five) states, including a state (or mode) 142, a state (or mode) 144, a state (or mode) 146, a state (or mode) 148 and a state (or mode) 150. The states 142 to 150 may be considered the states of the electronic control unit 114, the states of the auxiliary power system 100, the states of the electrical system 80 and/or the states of the vehicle 70.

The state 142 may implement an internal combustion engine on powered mode. While in the state 142, if the engine 72 of the hybrid vehicle 70 is generating mechanical power, the mechanical power may be converted by the vehicle power source 81 into the high-voltage signal HVB. The signal HVB may be received by the main high-voltage battery 83. The auxiliary power system 100 may down-convert the signal HVA from the main high-voltage battery 83 to produce the signal LVB that drives the high-power loads 94. The signal LVB may also charge the auxiliary system backup battery 112.

The state 144 may implement a wall powered mode. When the engine 72 of the vehicle 70 is stopped (e.g., ICE OFF), the electronic control unit 114 may transition to the state 144. While in the state 144, electronic control unit 114 may command the switch 108 to connect the signal LVD to the signal LVB. If low-voltage power is available from the battery charger plug 110, the low-voltage power in the signal LVD may be routed through the switch 108 to the signal LVB and out to the high-power loads 94.

If insufficient electrical power is received from the battery charger plug 110, the electronic control unit 114 may command the converter 106 into the down-conversion mode. The main high-voltage battery 83 may provide current to the converter 106 via the signal HVA. The converter 106 may generate the signal LVC that is subsequently routed through the switch 108 to the auxiliary low-voltage bus 90 as the signal LVB.

If the engine 72 is started while the electronic control unit 114 is in the state 144, the electronic control unit 114 may command the switch 108 to change the connection for the signal LVB from the signal LVD back to the signal LVC, if not already connected. The electronic control unit 114 may subsequently transition (e.g., ICE ON) back to the state 142.

The state 146 may implement an auxiliary mode state. If the battery charger plug 110 is unplugged and the engine 72 is off while in the state 144, the electronic control unit 114 may transition (e.g., UNPLUGGED) to the state 146. While in the auxiliary mode state 146, the electronic control unit 114 may command the switch 108 to route low-voltage power from the signal LVE to the signal LVB. The auxiliary low-voltage bus 90 may route the power to the high-power loads 94 as the signal LVB.

If insufficient power is available from the auxiliary connector 124, and since the engine 72 is not running while in the state 146, the electronic control unit 114 may command the converter 106 into the down-conversion mode, and command the switch 108 to connect the signal LVC to the signal LVB. The high-voltage energy stored in the main high-voltage battery 83 may be discharged into the converter 106. The converter 106 may generate low-voltage power in the signal LVC. The switch 108 may route the signal LVC to the signal LVB to drive the high-power loads 94.

If the battery charger plug 110 receives power while in the state 146, the electronic control unit 114 may transition (e.g., PLUGGED) back to the state 144. Thereafter, the electronic control unit 114 may command the switch 108 to route power from the signal LVD to the signal LVB to drive the high-power loads 94.

If the engine 72 is started while in the state 146, the electronic control unit 114 may transition (e.g., ICE ON) back to the state 142. The electronic control unit 114 may command the converter 106 into the down-conversion mode and command the switch 108 to route the low-voltage power in the signal LVC to the signal LVB to drive the high-power loads 94.

The state 148 may implement a wall charger mode. Upon a transition (e.g., CHARGE CMD) to the state 148, the electronic control unit 114 may command the switch 108 to connect the signal LVD to the signal LVC in the state 148. The electronic control unit 114 may also command the converter 106 into the up-conversion mode. In the up-conversion mode, the converter 106 may charge the main high-voltage battery 83 using the power in the signal LVD as received through the battery charger plug 110. In some embodiments, the switch 108 may also be commanded to route power from the signal LVD to the signal LVB to recharge the auxiliary system backup battery 112. Once the main high-voltage battery 83, and optionally the auxiliary system backup battery 112, are sufficiently recharged and/or the user chooses to end the recharging, the electronic control unit 114 may return (e.g., NORMAL CMD) to the state 144 by issuing a set of commands to the switch 108 and the converter 106.

The state 150 may implement an auxiliary charge state. From the state 146, the electronic control unit 114 may transition (e.g., CHARGE CMD) to the state 150. In the state 150, the electronic control unit 114 may command the switch 108 to connect the signal LVE to the signal LVC. The electronic control unit 114 may also command the converter 106 into the up-conversion mode. In the up-conversion mode, the converter 106 may charge the main high-voltage battery 83 using the power in the signal LVE received through the auxiliary connector 124. In some embodiments, the switch 108 may also be commanded to route power from the signal LVE to the signal LVB to recharge the auxiliary system backup battery 112. Once the main high-voltage battery 83, and optionally the auxiliary system backup battery 112, are sufficiently recharged and/or the user chooses to end the recharging, the electronic control unit 114 may return (e.g., NORMAL CMD) to the state 146 by issuing a set of commands to the switch 108 and the converter 106.

If the battery charger plug 110 receives power while in the state 150, the electronic control unit 114 may transition (e.g., PLUGGED) back to the state 148 and command the switch 108 to route power from the signal LVD to the signal LVC. If the battery charger plug 110 loses power while in the state 148, the electronic control unit 114 may transition (e.g., UNPLUGGED) to the state 150 and command the switch to route power from the signal LVE to the signal LVC. While five states are illustrated in the example implementation, other numbers of state and transition triggers may be implemented to meet the design criteria of a particular application.

The functions performed by the diagrams of FIGS. 1-3 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMS (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

While the invention has been particularly shown and described with reference to embodiments thereof, it will be understood by those skilled in the art that various changes in form and details may be made without departing from the scope of the invention.

The invention claimed is:

1. An apparatus comprising:
   a converter configured to
      generate a high-voltage signal by up-converting a first low-voltage signal received from a source external to a vehicle while in an up-conversion mode to recharge a high-voltage battery of said vehicle, and
      generate a second low-voltage signal on a power rail of said vehicle by down-converting said high-voltage signal received from said high-voltage battery while in a down-conversion mode; and
   a switch configured to route a third low-voltage signal generated by said converter to said power rail in response to a command signal while said apparatus is in a first mode.

2. The apparatus according to claim 1, wherein
   said second low-voltage signal is generated in part from power derived from an internal combustion engine of said vehicle, and
   said vehicle is a hybrid vehicle.

3. The apparatus according to claim 1, wherein
   said second low-voltage signal is generated solely from power derived from said high-voltage battery of said vehicle and
   said vehicle is an electric vehicle.

4. The apparatus according to claim 1, wherein
   an interface configured to receive said first low-voltage signal from said source external to said vehicle is connected to said switch, and
   said command signal instructs said switch to route said first low-voltage signal to said power rail while said apparatus is in a second mode.

5. The apparatus according to claim 4, further comprising a second interface connected to said switch and configured to receive a fourth low-voltage signal, wherein said command signal instructs said switch to route said fourth low-voltage signal to said power rail while said apparatus is in a third mode.

6. The apparatus according to claim 5, wherein said switch is further configured to route said first low-voltage signal from said interface to said converter while said apparatus is in a fourth mode.

7. The apparatus according to claim 6, wherein said switch is further configured to route said fourth low-voltage signal from said second interface to said converter while said apparatus is in a fifth mode.

8. The apparatus according to claim 4, further comprising a low-voltage battery connected to said power rail, wherein
   said switch is a break-before-make switch when changing between modes, and
   said low-voltage battery maintains power on said power rail while said switch breaks all connections while changing between modes.

9. The apparatus according to claim 1, further comprising an electronic control unit configured to
   control a mode of said apparatus in response to a plurality of commands received from a user interface device of said vehicle, and
   control said converter between said up-conversion mode and said down-conversion mode.

10. The apparatus according to claim 9, wherein said electronic control unit is further configured to report a status of said switch to said user interface device.

11. The apparatus according to claim 1, wherein
    said power rail has a first voltage in a first range from approximately 10 volts to approximately 50 volts,
    said high-voltage battery has a second voltage in a second range from approximately 200 volts to approximately 600 volts, and
    said power rail drives one or more loads up to 15,000 watts.

12. A method for auxiliary power distribution in a vehicle, comprising the steps of:
- generating a high-voltage signal by up-converting a first low-voltage signal received from a source external to said vehicle while in an up-conversion mode to recharge a high-voltage battery of said vehicle;
- generating a second low-voltage signal on a power rail of said vehicle by down-converting said high-voltage signal received from said high-voltage battery while in a down-conversion mode; and
- routing a third low-voltage signal to said power rail using a switch in response to a command signal while in a first mode.

13. The method according to claim 12, wherein
- said second low-voltage signal is generated in part from power derived from an internal combustion engine of said vehicle, and
- said vehicle is a hybrid vehicle.

14. The method according to claim 12, wherein
- said second low-voltage signal is generated solely from power derived from said high-voltage battery of said vehicle and
- said vehicle is an electric vehicle.

15. The method according to claim 12, further comprising the steps of:
- controlling a mode of operation using an electronic control unit in response to a plurality of commands received from a user interface device of said vehicle, and
- selecting between said up-conversion mode and said down-conversion mode.

16. The method according to claim 15, further comprising the step of:
- reporting a status of said switch to said user interface device.

* * * * *